P. H. BIEMAN.
FISHING REEL.
APPLICATION FILED APR. 24, 1917.
1,265,038.
Patented May 7, 1918.
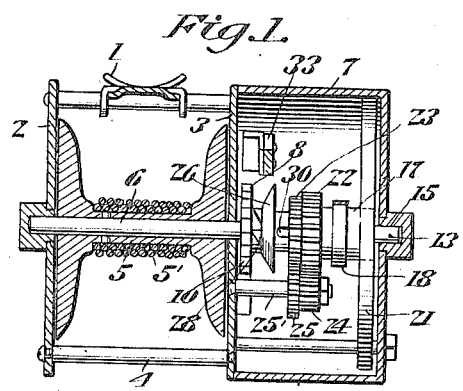
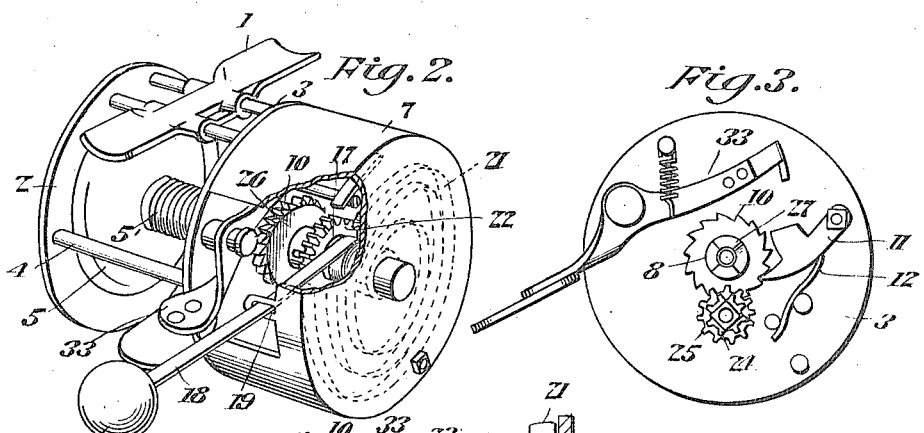
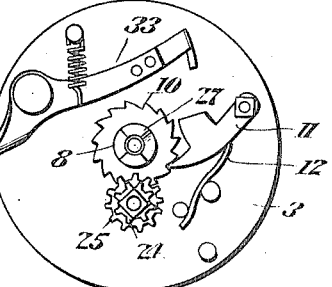
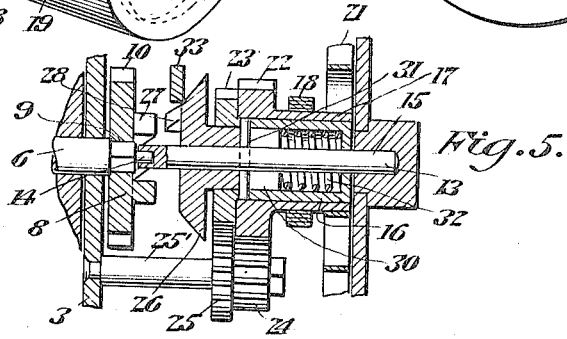
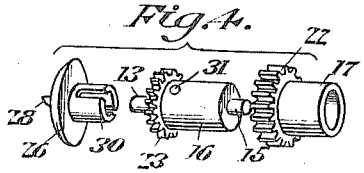
WITNESSES
INVENTOR
P. H. Bieman
BY Victor J. Evans
ATTORNEY

UNITED STATES PATENT OFFICE.

PHILLIP H. BIEMAN, OF ST. LOUIS PARK, MINNESOTA.

FISHING-REEL.

1,265,038. Specification of Letters Patent. Patented May 7, 1918.

Application filed April 24, 1917. Serial No. 164,184.

*To all whom it may concern:*

Be it known that I, PHILLIP H. BIEMAN, a citizen of the United States, residing at St. Louis Park, in the county of Hennepin and State of Minnesota, have invented new and useful Improvements in Fishing-Reels, of which the following is a specification.

This invention relates to improvements in fish line reels, and has particular application to a fish line reel wherein the spool is rotated by pulling upon a cord.

The primary object of this invention is to provide an improved operating mechanism for the reel.

Another object is to provide an improved coupling between the winding mechanism and the line spool.

A further object is to furnish a convenient means for manually disengaging the coupling from the line spool, and to supply a detent for preventing rotation of the spool which will be released by such manual means simultaneously with the disengagement of the coupling.

With these and other objects in view the invention resides in the construction, combination, and arrangement of parts set forth in the accompanying specification and claims, and illustrated in the drawings, wherein—

Figure 1 is a longitudinal sectional view of the reel.

Fig. 2 is a perspective view of the reel, showing the case containing the mechanism broken away to expose the interior.

Fig. 3 is an end view with the case removed to show the mechanism.

Fig. 4 is a perspective view of the reel and mechanism, showing the parts of the latter disassociated.

Fig. 5 is a longitudinal sectional view of the clutch member and the winding shaft.

Referring to the drawings more particularly, the reel is provided with, in the usual manner, a frame 1 adapted for attachment to a rod, and having heads, 2 and 3, connected by pillars 4, wherein is suitably journaled the line spool 5 for receiving a line 5'. In the present instance the spool 5 is provided with a shaft 6 extending through the head 3, and on the head a case 7 is secured wherein the mechanism is located. For rotation of the spool 5 a clutch 8 is positioned upon the shaft 6 exteriorly of the head, and relative rotation of the clutch member and the spool is prevented in any convenient manner, as for example by squaring the shaft 6 and forming the clutch member with a correspondingly shaped opening 9. The periphery of the clutch member 8 is formed with teeth 10, and to normally prevent rotation of the spool 5 in the unwinding direction, and permit free rotation in the opposite direction, a pawl 11 is pivotally mounted upon the head 3 for engagement with the teeth, and may be provided with a suitable spring 12 or other means to insure such engagement.

Journaled at the end of the line spool shaft for independent rotation coaxially therewith is what may be termed a winding shaft 13, and as here shown such journals comprise a reduced prolongation 14 of the line shaft 6 engaging a recess in the end of the winding shaft, and a suitable extension 15 of the winding shaft engaging a recess in the case.

The shaft 13 has a spaced concentric shell 16 constituting a bearing for the winding spool 17, and rigidly attached to an annular shoulder or rim formed on the shaft toward the opposite extremity from the clutch member 10. The winding spool 17 comprises an annulus loosely mounted upon the shell 16 for manual rotation; to effect which a cord or flexible strip 18 is wound a desired number of times around the spool and carried through a guide 19 on the casing 7 and terminally provided with a conveniently formed hand hold 20. For rewinding the strip 18 a suitable spring 21 is employed, here shown as helical in form, and having one end attached to the spool 17 and the other end attached to the casing.

For transferring the rotation of the winding spool to the winding shaft, I secure upon the spool a gear 22, and upon the shell 16 adjacent thereto a gear 23, and meshing with the gears 22 and 23 respectively are gears 24 and 25, attached each to each to prevent independent rotation and properly journaled, as for instance on a stud 25' attached to the head 3.

To transmit the rotation of the winding shaft 13 to the reel shaft 6 I utilize a cone shaped clutch member 26 slidably mounted upon the winding shaft for rotation therewith in face to face relation with the clutch member 8; and the respective faces are formed with teeth 27 and 28 adapted to engage in a winding rotation of the shaft 13, and to disengage in a reverse rotation. The clutch member has an annular extension adapted to enter the space between the shell 16 and the shaft 15, and this extension is formed longitudinally with a slot 30 engaging a pin 31 inserted transversely of the shaft, whereby relative longitudinal movement is permitted and relative rotation prevented. A suitable spring means 32 is provided within the shell 16 to normally maintain the clutch members in engagement.

Pivotally mounted upon the head 3 is a lever 33 extending outwardly through an opening formed in the case 7 for convenient manual actuation. The inner portion of the lever 33 extends in proximity to the cone face of the clutch member 26, and terminates adjacent the pawl 11, whereby in the movement of the lever the pawl and the clutch will be simultaneously disengaged to permit the line to unreel.

From the above it will be apparent that by grasping the hand hold and repeatedly pulling the cord the line may be wound up as desired; and that by depressing the lever 33 with the thumb of the hand grasping the rod, the line spool will be permitted free rotation to unwind the line.

While I have here shown and described a preferred form of my invention for purposes of illustration, such embodiment is not to be interpreted as limiting the scope thereof, it being apparent that many and varied forms may be constructed without departing from the spirit of the invention.

What I claim is

1. A fishing reel comprising a spool, a stationary clutch part connected therewith and having teeth thereon, a detent engaging with said teeth to prevent reverse movement of the spool, winding means for the spool, a sliding clutch part connected therewith and normally engaging with the other clutch part, and a lever for moving said sliding part into inoperative position and to disengage the detent from the teeth.

2. A fishing reel comprising a spool, a supporting shaft therefor, a disk secured to said shaft and having clutch teeth thereon, a detent engaging with said disk for preventing reverse movement thereof, a winding shaft, a drum secured thereon having gear teeth, a winding drum located on the first mentioned drum and provided with gear teeth, idle gears connected together and meshing with the before mentioned gear teeth, means for winding said drum, a spring for returning the drum to normal position, a movable clutch part connected with the driving shaft and having teeth thereon adapted to engage with the teeth on the disk, and a lever for moving said part out of engagement with the teeth on the disk and to throw the detent into inoperative position.

In testimony whereof I affix my signature.

PHILLIP H. BIEMAN.